Feb. 7, 1950 W. D. HERSHBERGER 2,496,998

RADIO ECHO SYSTEMS WITH MEANS FOR PROTECTING RECEIVERS

Filed Nov. 8, 1939

Inventor
William D. Hershberger
By
[signature]
Attorney

Patented Feb. 7, 1950 2,496,998

UNITED STATES PATENT OFFICE 2,496,998

RADIO ECHO SYSTEMS WITH MEANS FOR PROTECTING RECEIVERS

William D. Hershberger, Haddonfield, N. J., assignor to Radio Corporation of America, a corporation of Delaware Application November 8, 1939, Serial No. 303,483

4 Claims. (Cl. 343—13)

This invention relates to pulse echo systems and more particularly to a pulse echo system in which the receiver is protected during the radiation of the pulse.

Pulse echo systems are used for detecting and measuring the distance from a pulse transmitter to a wave-reflecting object. In systems of this type, a substantial amount of energy is radiated over a brief interval. If a common antenna or projector is used for transmitting and receiving, it is especially desirable to protect the receiver so that the outgoing pulse will neither damage nor block the receiver. The problem of protecting the receiver becomes very pronounced as the pulse power is increased. The problem is also emphasized for extremely short pulses which are used in measuring short distances. In one prior art system, the initial pulse is balanced out by applying an equal amount of energy in opposite phase to the receiver. It is well known that it is difficult to obtain an exact and lasting balance in systems of this type.

The present application describes a pulse echo system in which the plate current of the oscillator or amplifier of the transmitter is used to protect the receiver. It has been found that the characteristic of the plate current corresponds to the characteristics required in the protection of the receiving device. It is, therefore, one of the objects of the invention to provide means for protecting the receiver of a pulse echo system. Another object is to provide means whereby a receiver protecting potential is derived from the transmitter as a function of the outgoing pulse. An additional object is to provide means whereby the receiver in a pulse echo system may be made inoperative for an interval corresponding to the outgoing pulse.

Figure 1:
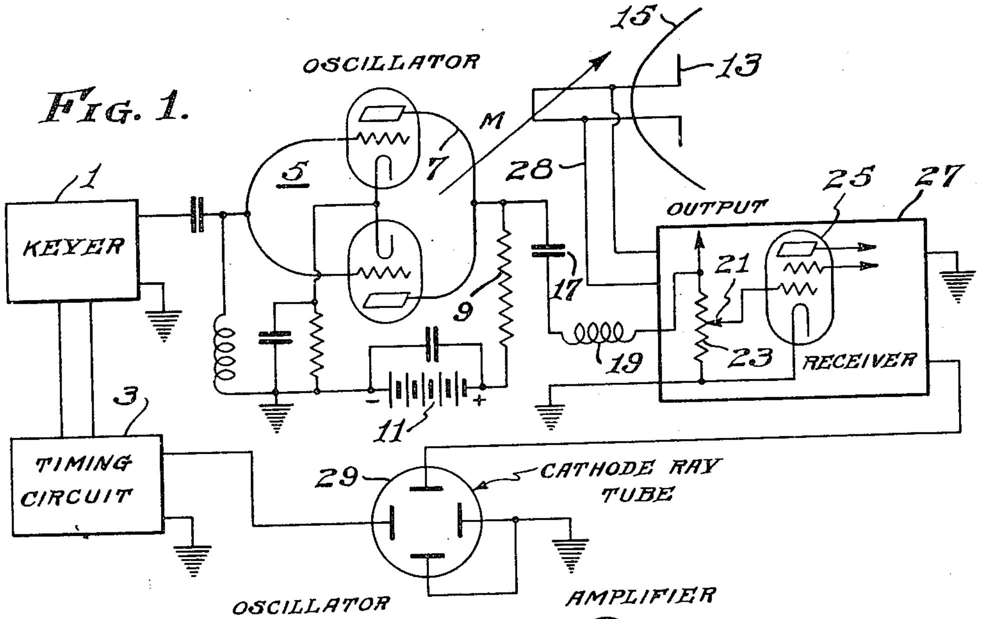
Figures 2, 3:
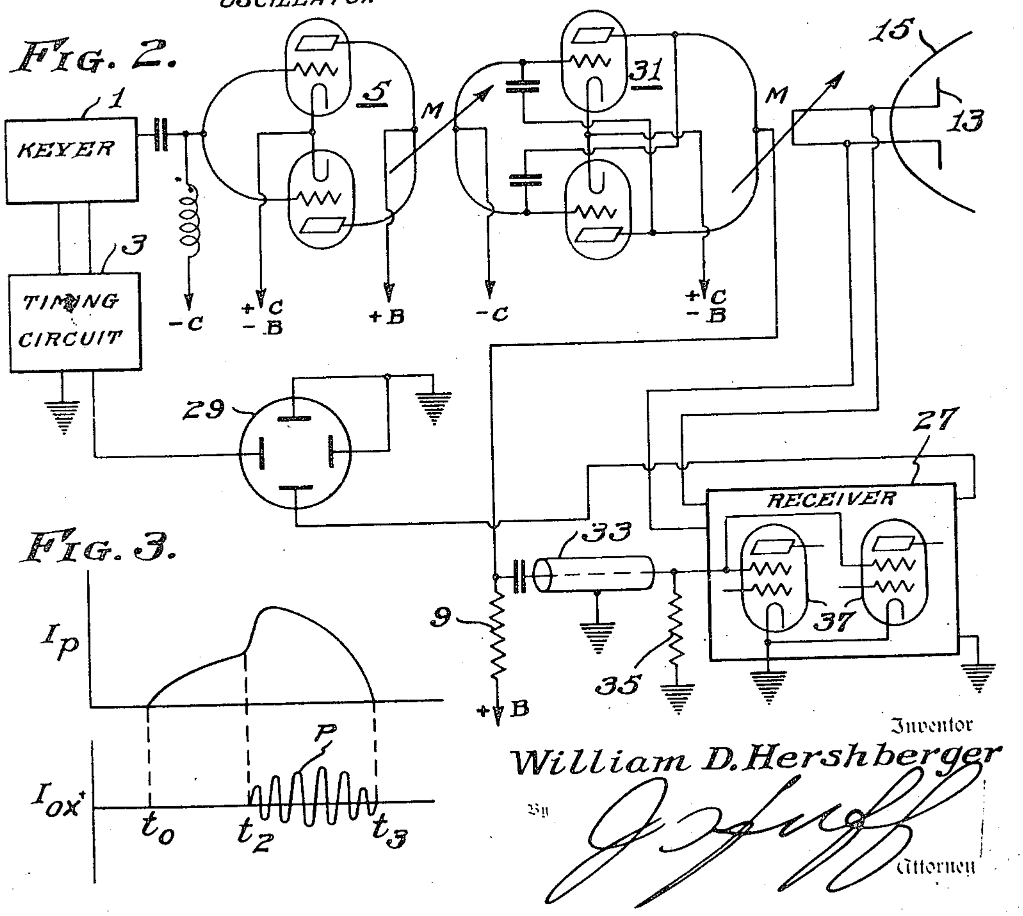

The invention will be described by referring to the accompanying drawing in which Figure 1 is a schematic circuit diagram of one embodiment of the invention; Figure 2 is a schematic circuit diagram of a modification; and Figure 3 is a graph illustrating the plate current characteristic of the transmitter. In describing the several figures, similar reference numerals will be applied to similar elements.

Referring to Fig. 1, a keyer or modulator 1 is connected to a timing circuit 3 and to an oscillator 5. By way of example, the oscillator is of the push-pull type in which the grid circuit is biased substantially to cut-off during the intervals between pulses. The anode circuit 7 is connected through a resistor 9 to the B power supply 11. The anode circuit is mutually coupled to a dipole or other suitable antenna 13 which may be directive by a reflector such as represented by the reference numeral 15. The anode circuit is also coupled through a blocking capacitor 17 and an inductor choke 19 to a potentiometer 23, which is shunted across the input circuit of one or more of the thermionic tubes 25 in the pulse echo receiver 27.

The input to the receiver may be connected by a transmission line 28 to the antenna 13. The details of a circuit using a common antenna are described in the copending application Serial No. 184,354, filed January 11, 1938, Patent No. 2,401,717, issued June 4, 1946, by Wolff and Hershberger, entitled "Signaling system," and assigned to the same assignee as the instant application. The output of the receiver is connected to one pair of the deflecting elements of a cathode ray tube 29. The other pair of deflecting elements of the tube are connected to the timing circuit. It should be understood that the cathode ray is deflected along one coordinate as a function of time or distance. The ray is deflected along the other coordinate when the reflected pulse is received, thus indicating the distance of the object which caused the echo.

The nature of the controlling or receiver protecting potential is indicated in Fig. 3. The oscillator, as previously explained, is biased to cut-off between the pulses. When the keying potential is applied to the input of the oscillator, the anode current $I_p$ slowly rises, beginning at time $t_0$, until the anode current is sufficiently large as, for example, at time $t_2$ to start a pulse or train of oscillations P. If the train has started at time $t_2$, the plate current continues to rise until a maximum is reached. The keying pulse then stops and the anode current gradually returns to zero at time $t_3$. Since the anode current $I_p$ flows through the resistor 9, it follows that the change in anode current may be applied in the proper polarity to block the receiver 27. It has been found that the receiver will be blocked before the time $t_2$ and the blocking will continue during the pulse period $t_2$ to $t_3$. In practice, there is usually a slight lag in the current flowing in the connections between the oscillator anode circuit and the receiver.

In the arrangement of Fig. 2, the keyer 1 is connected to a master oscillator 5, which is suitably coupled to a class C amplifier 31. The output of the amplifier is applied to an antenna 13 which may include directive means 15. The anode circuit of the class C amplifier 31 is connected through a resistor 9 to the positive terminal of the B source, which is not shown. The value of the resistor may be so chosen as to match a transmission line 33, which is terminated in a matching resistor 35. The matching resistor 35 is connected to the suppressor grids of the thermionic tubes 37 in the radio receiver 27. The output of the receiver is applied to the cathode ray tube 29. The cathode ray tube is connected to the timing circuit 3, as previously described.

The operation of the instant circuit is not unlike the operation of the circuit of Fig. 1. In the present arrangement, the class C amplifier is biased to cut-off, as is well known to those skilled in the art. Since the amplifier is biased to cut-off, no current flows through the resistor 9 until a pulse of radio frequency energy is applied at time $t_0$, as illustrated in Fig. 3. The rising anode current in the amplifier causes a voltage drop across the resistor 9. This voltage is applied to the suppressor grids to diminish the sensitivity and thus protect the receiver during the instant of the generation and radiation of the outgoing pulse.

Thus the invention has been described as a pulse echo system in which changes in current in the oscillator or amplifier of the transmitter are suitably applied to protect the receiver. It should be noted that either the oscillator or the amplifier, or both, may be keyed. It is noted that the protecting potentials are applied in synchronism with the generation and radiation of the outgoing energy, so that the receiver is thoroughly protected by diminishing its sensitivity at the instants when protection is most needed. Full receiver sensitivity is obtained after a pulse has been radiated. While the invention has been described with particular reference to radio echoes, it should be understood that the system or method will apply equally well to sound pulses of audible or supersonic frequency. If the system is used for sound wave transmission and reception, the only essential change is the substitution of a sound radiator for the antenna. Such sound radiators correspond to loudspeakers of the inductive, magnetostrictive, or piezoelectric types.

I claim as my invention:

1. A pulse echo system including a transmitter oscillator that is to be amplitude modulated by periodic modulating pulses, said oscillator comprising a thermionic tube biased to cut-off between said pulses, means for producing modulating pulses and for amplitude modulating said oscillator by said pulses, said pulses each having a front edge that begins at a time $t_0$ and having a long enough duration so that the anode current of the oscillator builds up to a value sufficient to cause the oscillator to oscillate to produce a pulse of radio frequency energy beginning at a later time $t_2$, means for radiating said pulse of radio frequency energy toward a pulse reflecting object, means connected to said tube for deriving a potential that is a function of the direct-current flowing in said tube during the application thereto of said modulating pulses, a receiver for receiving said pulses after their reflection from said object, and means for applying said derived potential to said receiver to block said receiver prior to the time $t_2$ and also during said pulse of radio frequency energy.

2. A pulse echo system including a transmitter oscillator that is to be amplitude modulated by periodic modulating pulses, said oscillator comprising a thermionic tube biased to cut-off between said pulses, means for producing modulating pulses and for amplitude modulating said oscillator by said pulses, said pulses each having a front edge that begins at a time $t_0$ and having a long enough duration so that the anode current of the oscillator builds up to a value sufficient to cause the oscillator to oscillate to produce a pulse of radio frequency energy beginning at a later time $t_2$, means for radiating said pulse of radio frequency energy toward a pulse reflecting object, a direct-current source, means including a resistor for connecting said source to said oscillator and means for deriving a potential from said resistor that is a function of the direct-current flowing in said tube during the application thereto of said modulating pulses, a receiver for receiving said pulses after their reflection from said object, and means for applying said derived potential to said receiver to diminish its sensitivity prior to the time $t_2$ and also during said pulse of radio frequency energy.

3. A pulse echo system including a transmitter oscillator that is to be amplitude modulated by periodic modulating pulses, said oscillator comprising a thermionic tube biased to cut-off between said pulses, means for producing modulating pulses and for amplitude modulating said oscillator by said pulses, said pulses each having a front edge that begins at a time $t_0$ and having a long enough duration so that the anode current of the oscillator builds up to a value sufficient to cause the oscillator to oscillate to produce a pulse of radio frequency energy beginning at a later time $t_2$, means for radiating said pulse of radio frequency energy toward a pulse reflecting object, means connected to said tube for deriving a potential that is a function of the direct-current flowing in said tube during the application thereto of said modulating pulses, a receiver including a thermionic tube for receiving said pulses after their reflection from said object, and means for applying said derived potential to the thermionic tube of said receiver to diminish its sensitivity prior to the time $t_2$ and also during said pulse of radio frequency energy.

4. A pulse echo system including a transmitter oscillator that is to be amplitude modulated by periodic modulating pulses, said oscillator comprising a thermionic tube biased to cut-off between said pulses, means for producing modulating pulses and for amplitude modulating said oscillator by said pulses, said pulses each having a front edge that begins at a time $t_0$ and having a long enough duration so that the anode current of the oscillator builds up to a value sufficient to cause the oscillator to oscillate to produce a pulse of radio frequency energy beginning at a later time $t_2$, means for radiating said pulse of radio frequency energy toward a pulse reflecting object, means connected to said tube for deriving a potential that is a function of the direct-current flowing in said tube during the application thereto of said modulating pulses, a receiver including a thermionic tube for receiving said pulses after their reflection from said object, and means for applying said derived potential to an electrode of said last thermionic tube to block said receiver prior to the time $t_2$ and also during said pulse of radio frequency energy.

WILLIAM D. HERSHBERGER.

REFERENCES CITED

The following references are of record in the file of this patent:

UNITED STATES PATENTS

| Number | Name | Date |
|---|---|---|
| 1,916,016 | Rives | June 27, 1933 |
| 1,924,174 | Wolf | Aug. 29, 1933 |
| 1,970,423 | Frink | Aug. 14, 1934 |
| 1,982,271 | Turner | Nov. 27, 1934 |
| 1,993,326 | Hart | Mar. 5, 1935 |
| 2,011,392 | Bentley | Aug. 13, 1935 |
| 2,055,883 | Terry | Sept. 29, 1936 |
| 2,256,539 | Alford | Sept. 23, 1941 |

FOREIGN PATENTS

| Number | Country | Date |
|---|---|---|
| 302,602 | Great Britain | May 30, 1929 |